May 7, 1940.　　　　D. L. KAUFMAN　　　　2,199,498
REFRIGERATING APPARATUS
Filed Oct. 27, 1938　　　3 Sheets-Sheet 1

INVENTOR.
Daniel L. Kaufman
BY Spencer Hardman and Fehr
ATTORNEYS

May 7, 1940.  D. L. KAUFMAN  2,199,498
REFRIGERATING APPARATUS
Filed Oct. 27, 1938  3 Sheets-Sheet 2

INVENTOR.
Daniel L Kaufman
BY Spencer Hardman and The
ATTORNEYS

Patented May 7, 1940

2,199,498

UNITED STATES PATENT OFFICE 2,199,498

REFRIGERATING APPARATUS

Daniel L. Kaufman, Dayton, Ohio, assignor to General Motors Corporation, Dayton, Ohio, a corporation of Delaware Application October 27, 1938, Serial No. 237,266

24 Claims. (Cl. 62—3)

This invention relates to refrigerating apparatus and heat transfer apparatus, and more particularly to improved means for controlling the flow of refrigerant through the evaporating means of simple and multiple refrigerating systems.

Heretofore in refrigerating apparatus it has been customary to use thermostatic expansion valves for controlling the flow of liquid into the heat transfer means or the evaporator. The thermostatic expansion valve ordinarily employed a bellows responsive to the pressure of the fluid flowing into the evaporator and had a second bellows entirely separate and insulated from the pressure operated bellows which was connected to a thermostat bulb fastened by a band clamped to the refrigerant conduit at the outlet of the evaporating means. This second bellows was operated ordinarily by the same refrigerant used in the system and operated by the temperature of the refrigerant at the outlet of the evaporating means so as to prevent the supply of more refrigerant than could be evaporated in the evaporating means.

When a refrigerant is used for control purposes it tends to condense at the coldest point and therefore such a system reflects the temperature of the coldest point in the form of the pressure of the control gas or controlled refrigerant. It therefore has been necessary to insulate the thermostatic portion from the remainder of the valve with considerable particularity, since the expansion valve is ordinarily colder than the refrigerant at the outlet of the evaporating means. This, however, necessitated a comparatively costly construction for these valves.

It is therefore an object of my invention to provide an improved system for a thermostatic expansion valve which will not require that the thermostatic portion be insulated from other portions of the valve and which will be so designed to prevent condensation in the valve.

It is another object of my invention to provide an improved and more simple control for a heat exchange unit.

It is another object of my invention to provide a thermostatic expansion valve in which a single bellows or diaphragm means is used for both the pressure operated control and the thermostatic control of the valve.

It is another object of my invention to provide a thermostatic expansion valve in which the thermostatic bulb is charged with an adsorbent and the valve is charged with a gas which will not condense in the valve under normal operating conditions.

It is another object of my invention to provide an improved expansion valve which is responsive to the temperature at a plurality of different points.

There has always been difficulty in providing a suitable control for the different evaporators of a multiple refrigerating system. This is especially true where the different compartments to be cooled by the different evaporators are to be kept at different temperatures. Heretofore, several different valves have been used for this purpose. Commonly, an inlet valve and an outlet valve have been provided for one or more evaporators in such a system. In addition, some form of control was necessary for controlling the operation of the motor compressor unit.

It is, therefore, an object of my invention to provide a simple inexpensive control system for controlling the flow of refrigerant through the evaporators in a multiple multi-temperature refrigerating system which will maintain each evaporator at the desired temperature without employing more than one valve per evaporator.

I have found that an improved, simplified thermostatic expansion valve can be used if a gas non-condensible at refrigerant temperatures is used in the thermostatic control system. I have found when a single thermostat bulb is used as an adsorber in connection with such a non-condensible gas in such a valve, that the liquid refrigerant within the evaporating means surges and the temperature and pressure conditions within the evaporating means as well as the suction pressure at the compressor rapidly fluctuate. This fluctuation is undesirable and reduces the efficiency of the evaporating means as well as the over-all efficiency of the system.

It is an object of my invention to provide an expansion valve which will prevent such fluctuating conditions and will assume the correct position to give the proper flow of refrigerant at all times in order to provide a gradual fall in pressure and temperature in the evaporating means during operating periods of the apparatus.

It is another object of my invention to control an expansion valve according to the refrigerating demand as well as the temperature of the refrigerant at the outlet of the evaporating means.

It is another object of my invention to provide an evaporating means with a thermostatic valve of gas-adsorption type heretofore referred to for controlling the flow of liquid refrigerant which will be responsive not only to the flow of refrigerant out of the evaporating means but also to the flow of air or other medium to be cooled away from the evaporating means.

It is still another object of my invention to provide a thermostatic expansion valve with an additional independent control which is responsive to the temperature of the air or the medium to be cooled by the evaporating means.

It is still another object of my invention to provide a valve control system for a heat transfer unit, which valve control system is responsive to the pressure and temperature of the one fluid and to the inlet and outlet temperature of the other fluid.

It is another object of my invention to control the expansion valve by the evaporator pressure, by the temperature of the refrigerant at the outlet of the evaporator, and by the temperature of the air or other fluid flowing to and away from the evaporator.

Further objects and advantages of the present invention will be apparent from the following description, reference being had to the accompanying drawings wherein a preferred form of the present invention is clearly shown.

Briefly, I have shown a multiple refrigerating system in which the operation of the motor-compressor unit is controlled by a low pressure control. An evaporating means is provided within a walk-in cooler which is preferably maintained at a temperature of about 42° F., and another evaporating means is provided for a display case which is preferably maintained at about 38° F. These two evaporating means are connected in parallel to the refrigerating system. The display case evaporating means is provided with a thermostatic expansion valve having a thermostatic system which includes a thermostat bulb upon the outlet of the evaporating means and a second bulb beneath the evaporating means, so that it is responsive to the temperature of the air cooled by the evaporating means. This valve has a single diaphragm which on one side is subject to refrigerant pressure within the evaporating means, and on the other side is subject to pressures in accordance with the temperature of the two thermostat bulbs. The two thermostat bulbs are charged with a gas such as carbon dioxide which is non-condensible under the prevailing conditions while an adsorbent for gas, such as activated charcoal, is placed in the thermostat bulbs. Preferably, the thermostat bulb beneath the evaporator has about twice as much charcoal in it as the bulb placed upon the refrigerant outlet of the evaporator.

The evaporating means for the walk-in cooler is provided with a valve which, likewise, employs carbon dioxide and charcoal or some other combination of this type and has a thermostat bulb upon the refrigerator outlet and another one located in the air stream on the outlet side of the evaporator. However, in addition, this valve has a separate diaphragm operating against a separate spring which is separately adjustable and which is capable of closing the valve regardless of the conditions of the two thermostat bulbs heretofore mentioned, and the pressure conditions existing upon the other diaphragm. This second diaphragm is preferably responsive to the temperature of the air within the walk-in cooler and is preferably placed in the path of the air flowing to the evaporating means. It may also use a non-condensable gas and an adsorbent or a refrigerant may be used. It is not necessary that a thermostat bulb be used with this diaphragm, but it may be possible to obtain better results by using a thermostat bulb, because a thermostat bulb may be placed more readily in a position where it can best reflect the temperature of the air within the walk-in cooler, and is not affected by the temperature of the valve body.

Figure 1:
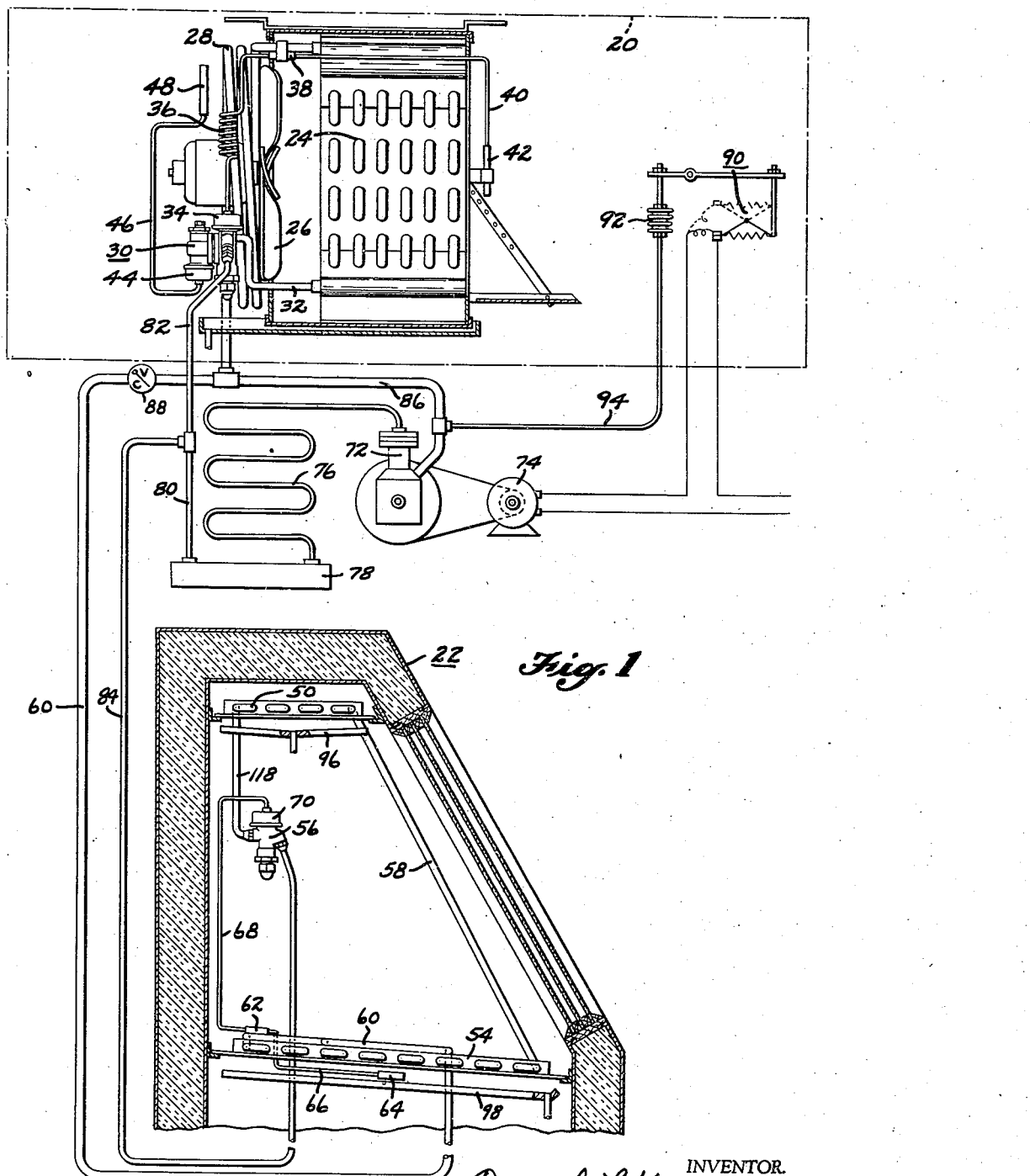
Fig. 1 is a view, partly diagrammatic, of a multiple refrigerating system applied for the purpose of illustrating the invention to a walk-in cooler and to a display case which are to be kept in different temperatures.

Referring now to the drawings, and more particularly to Fig. 1, there is shown a walk-in cooler 20, illustrated by dot and dash lines, which should be kept at a temperature of about 42° F. There is also shown a display case 22 which should be kept at about 38° F. The walk-in cooler 20 is cooled by a forced air type of evaporating means 24 which is preferably suspended from the top wall of the walk-in cooler. This evaporating means 24 is preferably of the vertical finned type and the refrigerant tubes pass through the fins upwardly in serpentine fashion and are provided with a common inlet at the bottom, and a common outlet at the top. The evaporating means is provided with an adjustable deflector upon its discharge side and a pan for collecting any moisture which should happen to condense upon and drip from the evaporating means. A motor driven fan 26 is provided upon the inlet side of the evaporating means and constantly forces air through the evaporating means. The outlet conduit 28 is formed into a coil larger than the diameter of the fan 26 placed immediately upon the inlet side of the fan to serve as a guard for the fan and also to act as a drying coil.

Figure 3:
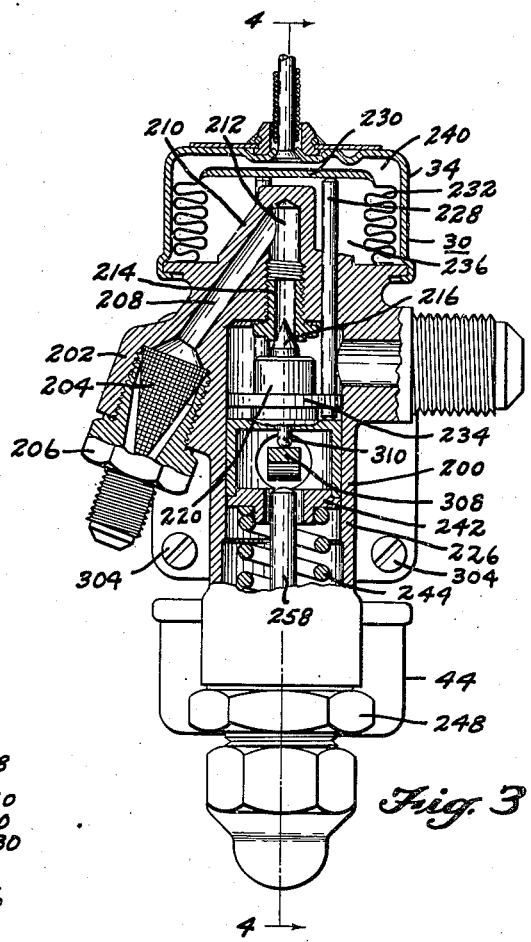
Fig. 3 is a view, partly in section, of the valve means for the evaporating means in the walk-in cooler taken along the line 3—3 of Fig. 4.
Figure 4:
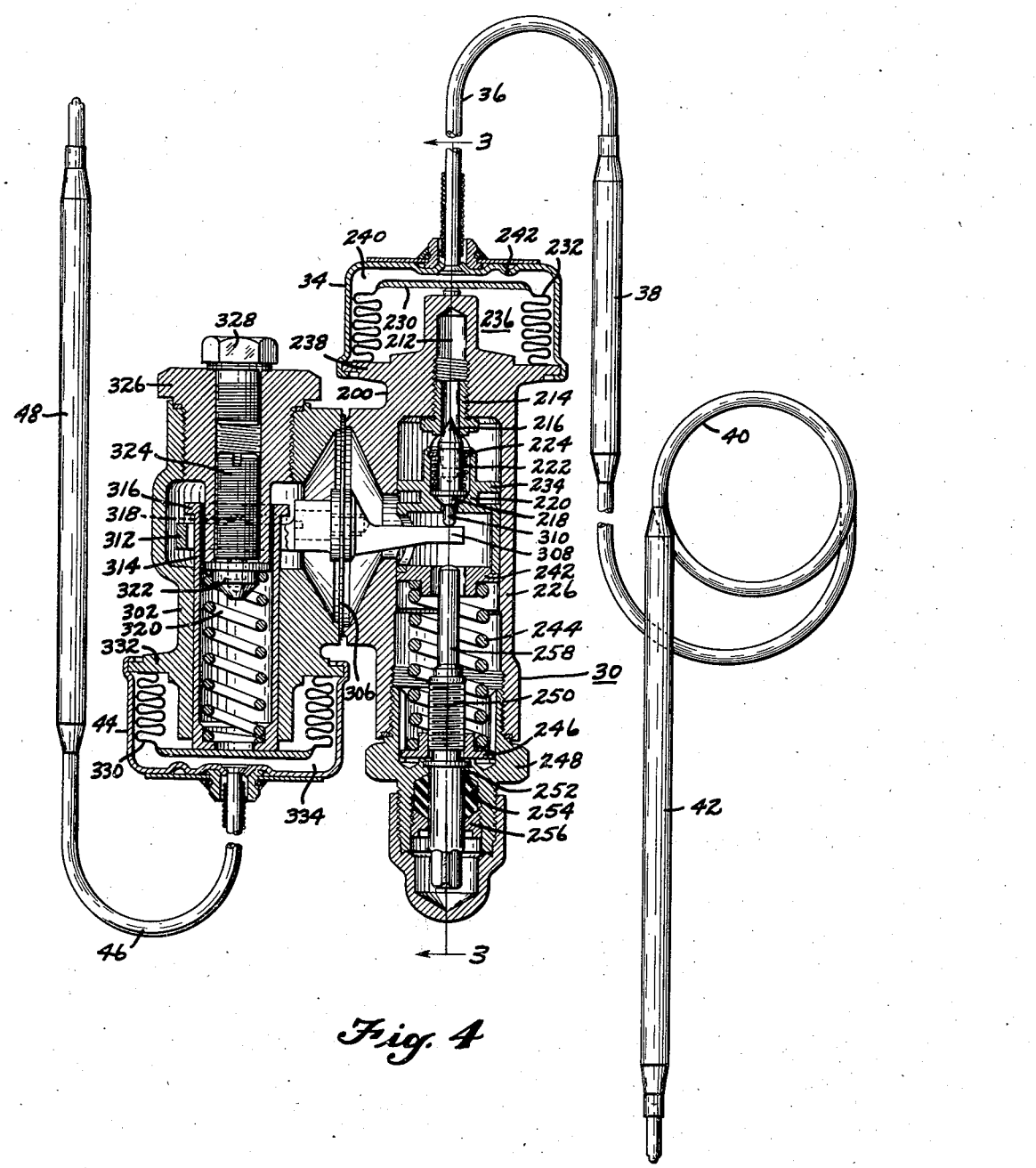
Fig. 4 is a sectional view taken along the line 4—4 of Fig. 3.

My improved thermostatic expansion valve 30 is connected by the conduit 32 to the inlet of the evaporating means 24. This valve is also shown in Figs. 3 and 4 and has a diaphragm chamber enclosed by a cap 34 which is connected by capillary tubing 36 to a thermostat bulb 38 clamped to the portion of the outlet conduit between the outlet of the evaporating means 24 and the drying coil 28. The bulb 38 is also connected by additional capillary tubing 40 to a larger thermostat bulb 42 which is supported by a clamp in the outlet air stream of the evaporating means 24. The thermostat bulb 38 is preferably filled with 40 to 60 mesh, 60 min. activated charcoal in the amount of about .375 to .40 gram. The bulb 42 is preferably filled with the same or different grade of activated charcoal but with about twice the amount of charcoal, that is, the second bulb 42 has about .75 or .80 gram of activated charcoal.

The diaphragm chamber, the thermostat bulbs and the connecting capillary tubing are preferably charged with carbon dioxide at a pressure of 50 lbs. at 60° F. If desired, other gases and other adsorbents may be used. For example, activated silica or activated aluminum may be used as a adsorbent and nitrogen or some other gas non-condensable under the prevailing conditions may be used in place of carbon dioxide.

The thermostatic expansion valve 30 has an additional diaphragm chamber enclosed by a cap member 44 which is connected by capillary tubing 46 to a thermostat bulb 48 located in the inlet air stream of the evaporating means 24. This thermostat bulb, diaphragm chamber and connecting tubing may be charged with a volatile liquid, or preferably the bulb is charged with activated charcoal of the same or different grade as used in the other thermostat bulbs and the bulb, and the diaphragm chamber and the connecting tubing are preferably charged with carbon dioxide at a pressure of 60 lbs. at 80° F., or some other pressure and temperature which is suitable for the different air temperatures which it is desired to maintain with the evaporating means.

This second thermostat control system closes the expansion valve when the temperature of the air flowing to the evaporating means reaches 42° F. Slightly above that temperature, it will reduce the flow of refrigerant, while at higher temperatures it will not affect the flow of refrigerant to the evaporating means. At these higher temperatures, the thermostat valve is entirely under the control of the other thermostat system including the bulbs 38 and 42 and the refrigerant pressure in the evaporating means.

I have found where only a single thermostatic bulb is used, that during the operating periods of the compressor, the suction pressure within the suction line and the pressure and temperature conditions within the evaporating means are constantly rising and falling with considerable rapidity. Surging of the liquid refrigerant in the evaporating means and the flow of liquid refrigerant into the suction line frequently take place under such conditions. These surging and fluctuating cooling conditions do not take place in all types of installations, but mainly occur in air cooling types of evaporating means for commercial and air conditioning purposes. These conditions will cause a reduction in efficiency and capacity of the refrigerating systems, and make it difficult to maintain constant and uniform temperature and humidity conditions in the compartment to be cooled. It seems that these fluctuating conditions are caused by the unavoidable lag in the heat transfer between the contents of the suction line at the outlet of the evaporating means and the contents of the thermostatic bulb.

I have found that these conditions can be avoided by employing the second bulb 42 shown connected in series with the thermostat bulb 38. In this construction, it is preferable that the bulb 42 be charged with a greater amount of adsorbent than the bulb 38. The large bulb aids greatly in providing smooth operation of the valve, since its temperature is gradually reduced throughout each operating cycle of the compressor unit, while the pressure within the evaporating means is being reduced gradually, thus modulating the evaporator pressure in relation to the temperature reduction. Thus, this added larger bulb insures the supply of liquid to the evaporating means generally according to the refrigerating requirements, while the smaller bulb prevents the flow of liquid refrigerant out of the evaporating means under any unusual conditions and, thereby, makes it possible to operate the system with the evaporating means substantially filled with liquid refrigerant. By this scheme, the fluctuations and surges of the liquid refrigerant within the evaporating means are overcome, and by providing more constant conditions, the capacity of the evaporating means is increased, and the efficiency of the entire system is improved.

In the display case 22, the evaporating means has an upper section 50 located in the top of the case, and a lower section 54 located beneath the window for cooling food which may be placed on pans or racks immediately above it and for cooling the bottom portion of the case. A more simple form of thermostatic expansion valve 56 controls the flow of liquid refrigerant into the upper evaporating means 50. The liquid refrigerant after passing through the upper refrigerating means 50 passes downwardly through the refrigerant conduit 58 to the front portion of the lower evaporating means 54. The rear portion of the evaporator 54 is connected to an outlet conduit 60 which is provided with the drying loop resting directly on top of the evaporating means 54.

This outlet conduit 60 adjacent the outlet of the evaporating means 54 is provided with a small thermostat bulb 62 and beneath the center portion of the evaporating means 54 in the path of the air flowing downwardly through the evaporating means 54 is positioned a larger thermostat bulb 64. This larger bulb 64 corresponds to the thermostat bulb 42 for the valve 30 and the bulb 62 corresponds to the bulb 38. The bulbs 62 and 64 are connected by the capillary tubing 66 and the bulb 62 is connected by the capillary tubing 68 with diaphragm chamber of the valve 56 which is enclosed by the cap member 70.

As mentioned previously, I have found that the control of the valve 56 by a single bulb mounted upon the outlet conduit does not provide satisfactory liquid control. I have found by adding the second bulb 64, a much more satisfactory liquid control is provided, since the second bulb provides a modulating effect upon the control provided by the other bulb 62. When an adsorbent is used in the bulbs, the pressure within the thermostatic system reflects the condition of both bulbs and their influence is the algebraic sum of their respective temperature conditions. That is, if the bulb 64 is cold, it will absorb some of the gas to tend to reduce the pressure of the system, while if the bulb 62 is warm it will tend to give off some gas and raise the pressure in the system.

These two evaporators are supplied with liquid refrigerant by means of a liquefying apparatus 80 which includes a compressor 72 driven by an electric motor 74 for compressing the refrigerant and for forwarding compressed refrigerant to the condenser 76 where the compressed refrigerant is liquefied and collected in the receiver 78. From the receiver 78, the liquid refrigerant is forwarded through the supply conduit 80 to the branch conduits 82 and 84 which conduct the liquid refrigerant to the thermostatic expansion valves 30 and 56. These expansion valves 30 and 56 control the flow of refrigerant through their respective evaporating means and the refrigerant is returned to the compressor through the outlet or suction conduits 28 and 60 which connect to the common suction conduit 86. The suction conduit 60 adjacent its connection to the common suction conduits 86 is preferably provided with a check valve 88 for preventing the refrigerant from the warm evaporating means 24 from condensing in the colder evaporating means 54.

The operation of the compressor motor 74 is controlled by a low pressure snap acting switch means 90 having its bellows 92 connected by a conduit 94 to the common suction conduit 86. This low pressure control 92 maintains a pressure within the suction line sufficiently low to maintain the evaporating means 50 and 52 at the proper temperature for maintaining the 38° temperature within the display case 22. The thermostat bulb 48 prevents the temperature of the walk-in cooler 20 from falling below 42° since it will prevent the supply of refrigerant to the evaporating means 24 whenever the temperature falls to that point. The display case 22 is provided with drip pans 96 and 98 located beneath the evaporating portions 50 and 54 in order to collect any moisture dripping from these portions.

Figure 2:
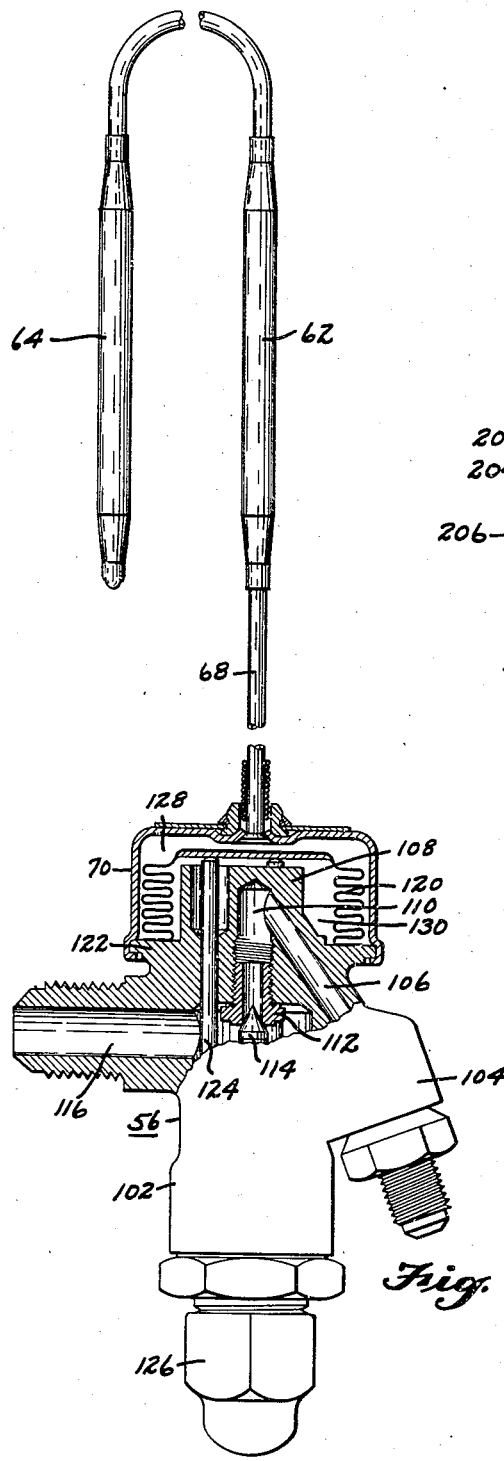
Fig. 2 is an enlarged view partly in section of the thermostatic expansion valve used for the evaporating means in the display case.

Referring now to Fig. 2 for details of the valve 56, there is shown a valve body 102 provided with an inlet 104 containing a passage 106 which leads to a boss 108 provided beneath the cap 70. This boss is provided with a central downwardly extending passage 110 into which is threaded a valve seat member 112 which is engaged by the valve needle 114 to shut off the flow of refrigerant from the passage 110 to the outlet passage 116. The outlet passage is connected to the conduit 118 which connects to the upper evaporating portion 50. The boss 108 is enclosed by a flexible metal bellows 120 having its lower open end sealed to a flange 122 provided on the valve body 56 and its upper closed end resting upon three pins 124 which extend downwardly to a slidable member which carries the valve needle 114. These three pins 124 extend through the valve body from the interior of the bellows 120 to the outlet passage 116. The passages through which these three pins 124 operate are not sealed so that the interior of the metal bellows 120 is subject to the pressure in the valve outlet portion 116 which is connected to the evaporating portion 50. Thus, the interior of the bellows 120 is responsive to evaporator pressures.

The valve body 122 contains a spring which urges the valve needle 114 into engagement with the seat member 112 to close the valve to the flow of refrigerant. This spring is provided with an adjusting means sealed by a suitable gland and enclosed by the cap member 126. This construction may be somewhat similar to that shown in Fig. 4. The cap member 70 has its lower open end sealed to the flange 122 and its upper end provided with an aperture to which is connected the capillary tube 68. Between the cap member 70 and the bellows 120 there is provided a diaphragm chamber 128 which, like bulbs 62 and 64, is charged with carbon dioxide or some other gas which is not condensible at prevailing temperatures. Thus, even though the valve body 102 has refrigerant passing through it, no insulation is required between the diaphragm chamber 128 which is connected to the thermostat bulbs 62 and 64 and the diaphragm chamber 130 which is connected to the valve outlet 116.

The bulbs 62 and 64 may be of the same size or the bulb 64 may be larger than the bulb 62. I have found it is desirable that a greater amount of adsorbent be provided in the thermostat bulb 64 than in the thermostat bulb 62 in order to get the best control condition for the valve. I have determined that this proportion should be roughly two to one, but in other situations, this proportion may vary. I prefer to use 40 to 60 mesh 60 min. activated charcoal, but other grades of charcoal and other adsorbents may be used if desired. Preferably, the thermostat bulb 64 contains about .75 or .80 gram of activated charcoal, and the thermostat bulb 62 contains .375 or .40 gram of activated charcoal. These two thermostat bulbs 62 and 64, as well as the diaphragm chamber 128 are preferably charged with carbon dioxide at a pressure of about 50 lbs. at 60° F. However, if desired, nitrogen or other gases non-condensible under the prevailing conditions may also be used. I prefer to connect the two bulbs 62 and 64 in series with each other and with the diaphragm chamber 128. However, if desired, these two bulbs 62 and 64 may be connected in parallel with each other without any appreciable change in their effect.

Referring now to Figs. 3 and 4 for a detailed explanation of the valve 30, there is shown a valve body 200 provided with an inlet boss 202 containing a screen 204 held in place by a nipple 206 threaded into the boss which provides a connection with the liquid supply conduit 82. This nipple 206 connects to an inlet passage 208 which extends upwardly at an angle to a boss 210 formed in the top of the valve body 200. This boss 210 also contains a centrally located downwardly extending passage 212 which receives a threaded valve seat insert 214. This valve seat 214 is engaged by a needle valve 216 having a flange 218 at its lower end which is held in engagement with a shoulder in a recess in the upper portion of the guide member 220 by a very light conical shaped coil spring 222. This coil spring 222 is held in place within the recess by a small washer 224 which, in turn, is held in place by bending or spinning over the upper portion of the guide member 220.

This guide member 220 is slidably mounted within a cylindrical shaped portion 226 of the valve body 200. The valve needle 216 is normally operated in accordance with the movements of the valve guide 220 which is connected by means of three symmetrically positioned pins 228 extending upwardly around the valve needle 216 and the central passage 212 to the closed end portion 230 of the metal bellows 232. The guide member 220 is drilled to receive the lower end of each of the pins 228. The valve body surrounding the central passage 212 is also drilled to receive the pins 228. These drilled passages, however, are not sealed so that the gas within the guide chamber has communication with the chamber 236 in the interior of the bellows 232.

The lower end of the bellows is connected to a flange 238 formed on the valve body to which is also connected the bottom edge or rim portion of the cap member 34. Between the cap member 34 and the bellows 232, there is provided a diaphragm chamber 240. This diaphragm chamber 240 is connected to the capillary tubing 36 which extends through and is sealed to an aperture in the central portion of the cap member 34. The cap member 34 is provided with a boss 242 which prevents the upper end portion 230 from seating tightly upon the top of the cap member so as to prevent the ingress or egress of gas from the capillary tube 36.

As mentioned before, the thermostat bulb 38 is preferably filled with either .375 to .40 gram of 40 to 60 mesh 60 min. activated charcoal, while the thermostat bulb 42 is provided with double this amount. The diaphragm chamber 240, the thermostats 38 and 42, and the connecting capillary tubing are preferably charged with carbon dioxide at a pressure of 50 lbs. at 60° F. I prefer to connect these bulbs in series with the diaphragm chamber 240, but they may be connected in parallel if desired without any material change in the effect on the operation of the valve. In order to adjust the operation of the valve insofar as the diaphragm 230 is concerned, the lower end of the guide member 220 has a spring retainer 242 connected to it. Fitted to the bottom face of this spring retainer 242 is a compression type coil spring 244 which has its lower end resting upon a lower spring retainer 246 guided within the nipple 248 provided with vertical grooves for preventing rotation and for guiding the lower spring retainer 246. This lower spring retainer 246 is threaded onto an adjusting screw 250 provided with a flange beneath the threaded portion which rests upon a shoulder 252 in the nipple 248. This shoulder also forms the upper end of a packing gland which is provided with a packing 254. This packing 254 is held tightly in engagement with the shank of the adjusting screw 250 by the gland nut 256 which is threaded into the nipple 248. The lower end of the shank of the adjusting screw 250 is provided with a square end so that the adjusting screw may be turned by means of a key or a wrench in order to change the tension of the spring 244 for changing the temperature at which the valve normally opens and closes according to the temperature of the bulbs 38 and 42 as well as for making it possible to use different charging pressures of the gas used in the diaphragm chamber 240 and the bulbs 38 and 42.

The adjusting screw 250 is also provided with a pin portion 258 which may be used for forcing the valve needle 216 into tight engagement with its seat. Preferably, the valve needle 216 is made of a very hard material while the valve seat 214 is made of a somewhat softer material and preferably has a sharp edge. I prefer to form this seat by using the adjusting screw 250 and its pin 258 to force the valve needle 216 into engagement with the sharp edges of the valve seat member 214 in order to coin a seat of narrow width in the seat member 214 for the valve needle. In this way, the seat conforms exactly to the shape of the valve needle and thus makes it possible to close the valve tightly.

Thus far, this valve functions to maintain the evaporating means 24 substantially filled with liquid refrigerant. However, without some additional control, the temperature of the air within the walk-in cooler 20 will be maintained at about the same temperature as the display case 22; because if the evaporating means is kept substantially filled with liquid refrigerant and the compressor under the control of the low pressure switch means 90 maintains a suction pressure low enough to maintain a temperature of 38° in the display case 22, the temperature of the walk-in cooler will probably fall below the temperature of the air in the display case. Usually a smaller temperature differential will exist where a forced air type of evaporating means is used than when a natural draft type of evaporating means is used. Even if the temperature differential between the evaporating means were the same in each case, it would still be necessary to provide an additional control in order to maintain the walk-in cooler at a higher temperature than the display case.

I have therefore, provided an additional thermostat bulb 48 which operates an additional control means for the valve. In order to do this, I have connected an additional control body 302 to the valve body 200 by means of the screws 304. The adjacent portions of the control body 302 and the valve body 200 are provided with square-shaped flanges the corners of which are pierced and connected by the screws 304. These square portions also serve to enclose diaphragm chamber containing a flat diaphragm 306 clamped between the two square portions of the two bodies by the screws 304 in order to seal the valve body 200 from the control body 302.

This diaphragm 306 forms a pivotal support of a two arm lever, one arm 308 extending through an aperture in the cylindrical portion 226 of the valve body 200, and through an aperture in the skirt portion of the guide member 220 so that its end portion is located directly beneath the valve needle 216. The valve needle 216 is provided with a pin portion 310 adapted to be engaged by the adjacent end of the lever arm 308. The other lever arm 312 extends into the control body 302 and is fastened to the lever arm 308 by the screw shown in dotted lines in Fig. 4 which serves to connect the lever arms 308 and 312 tightly together with the center portion of the diaphragm 306 in between.

The lever arm 312 is provided with a circular opening which receives a cylindrical follower 314 having a flange 316 at its upper end which bears upon a pair of nibs 318 formed on opposite sides of the lever arm 312. The lower end of the follower 314 is provided with an inwardly extending flange which supports the lower end of the compression type coil spring 320. The upper end of this spring is supported by a spring retainer 322 provided at the lower end of the adjusting screw 324. This adjusting screw is threaded within a bushing 326 sealed to the control body 302. The opening providing access to the adjusting screw is sealed by a cap screw 328 provided with sealing washers beneath its head.

The lower inwardly flanged end of the follower 314 rests upon the closed end portion of the metal bellows 330. This metal bellows has its open end sealed to the flange 332 to which is also sealed the open end of the cap member 44. Between the bellows 330 and the cap member 44 is the diaphragm chamber 334 wherein pressure is exerted to counteract the force of the compression spring 320. This diaphragm chamber 334 is connected to the thermostat bulb by the capillary tubing 46 which pierces the cap member 44 and is sealed thereto. The cap member 44 is preferably provided with a projection for preventing the end portion of the bellows 330 from seating tightly upon the mouth of the capillary tubing 46.

The diaphragm chamber 334 as well as the thermostat bulb 48 and the connecting capillary tubing 46 may be filled with a volatile liquid since the control body 302 is separated thermally from the valve body 200. However, in order to prevent any thermal influence of this portion of the control, I prefer to use activated charcoal and carbon dioxide. Preferably, the bulb 48 is filled with charcoal of the same grade and quality as the other two bulbs 38 and 42. The thermostat bulb, the diaphragm chamber and the connecting capillary tubing are preferably charged with carbon dioxide at a pressure of 60 lbs. at 80° F. However, other charging pressures and temperatures may be used if so desired, and other adsorbents and gases may be used.

The quantity of the charcoal and pressure and temperatures of the carbon dioxide are so selected that when the temperature of the air in the walk-in cooler is materially above 42° F. the arm 308 is out of engagement with the pin portion 310 of the needle valve 216 so that the valve can operate solely under the influence of the diaphragm 230. The spring 320 is made to have such characteristics and is adjusted to such a tension that as the temperature of the air within the walk-in cooler 20 approaches 42° F., the charcoal in the bulb 48 will be reduced to a temperature sufficiently to reduce the pressure of the carbon dioxide by adsorption, so that the spring 320 begins to move the arm 308 into contact with the pin portion 310 so as to move the needle valve 216 towards closed position. When the thermostat bulb 48 reaches a temperature of 42° F., the needle valve will be tightly closed.

Should there be a comparatively high pressure exerted on the diaphragm 230 tending to move the valve guide 220 downwardly, the valve needle 216 will remain against its seat in closed position because it is supported by the arm 308 while the guide 220 will move downwardly independently of the needle valve 216. Under such conditions, the light coil spring 222 will be compressed and the needle valve 216 will be lifted off its seat in the guide member 220. By moving the adjusting screw 324 downwardly so as to increase the tension on the spring 320, the temperature at which the needle valve will be closed will thereby be lowered and conversely as the tension is reduced, the temperature at which the needle valve is held closed will be raised.

While I prefer to use a thermostat bulb 48 connected to the diaphragm chamber 334 this thermostat bulb and the capillary tubing may be omitted if desired and the diaphragm chamber 334 may itself be charged with charcoal and carbon dioxide or with a volatile liquid. This is possible because the cap member 44 is freely exposed to the air which is being drawn toward and forced through the evaporator by the fan 26. Thus, by the use of these valves in such a system, I have provided a simple control for a multiple system which will maintain two different temperatures, particularly when used with a low pressure control. The low pressure control will cause the starting of the compressor whenever refrigerant in sufficient quantity flows out of either evaporator so that refrigeration is provided whenever required by either evaporator. Such a system greatly simplifies the control required for a multiple multi-temperature system.

While my improved valve control system has been shown applied to a refrigerating system, these valves may be modified slightly and the same system used for controlling different forms of heat transfer means such as hot water and steam radiators. In making this change, it is merely necessary to change the operation of valves so that the heating of the thermostat bulbs tends to close the valve rather than to open the valve. While throughout the specification and claims the terms "absorbent" and "adsorbent" have both been used, either term is intended to include both wherever absorbents and adsorbents are equivalents.

While the form of embodiment of the present invention as herein disclosed constitutes a preferred form, it is to be understood that other forms might be adopted, all coming within the scope of the claims which follow.

What is claimed is as follows:

1. Refrigerating apparatus including refrigerant evaporating means for cooling a fluid, a valve means for controlling the flow of liquid refrigerant into the evaporating means, said valve means having diaphragm operating means, said valve means having a thermostat bulb located in heat exchange relation with the refrigerant outlet of the evaporating means, said valve means having a second thermostat bulb located in the path of and responsive to the cooled fluid flowing away from the evaporating means, said valve means having a third thermostat bulb located in the path of and responsive to the fluid to be cooled flowing to the evaporating means, said thermostat bulbs being operatively connected to said diaphragm operating means.

2. Refrigerating apparatus including refrigerant evaporating means for cooling a fluid, a valve means for controlling the flow of liquid refrigerant into the evaporating means, said valve means having diaphragm operating means, said valve means having a thermostat bulb located in heat exchange relation with the refrigerant outlet of the evaporating means, said valve means having a second thermostat bulb located in the path of and responsive to the cooled fluid flowing away from the evaporating means, said first and second bulbs being connected in series and being operatively connected to said diaphragm means, said first and second bulbs containing an adsorbent and a gas capable of being adsorbed and evolved therefrom upon changes in temperature.

3. Refrigerating apparatus including refrigerant evaporating means for cooling a fluid, a valve means for controlling the flow of liquid refrigerant into the evaporating means, said valve means having diaphragm operating means, said valve means having a thermostat bulb located in heat exchange relation with the refrigerant outlet of the evaporating means, said valve means having a second thermostat bulb located in the path of and responsive to the cooled fluid flowing away from the evaporating means, said valve means having a third thermostat bulb located in the path of and responsive to the fluid to be cooled flowing to the evaporating means, said thermostat bulbs being operatively connected to said diaphragm operating means, said third thermostat bulb being effective to close the valve means when its temperature is reduced to a predetermined temperature.

4. Refrigerating apparatus including refrigerant evaporating means for cooling a fluid, a valve means for controlling the flow of liquid refrigerant into the evaporating means, said valve means having diaphragm operating means, said valve means having a thermostat bulb located in heat exchange relation with the refrigerant outlet of the evaporating means, said valve means having a second thermostat bulb located in the path of and responsive to the cooled fluid flowing away from the evaporating means, said valve means having a third thermostat bulb located in the path of and responsive to the fluid to be cooled flowing to the evaporating means, said thermostat bulbs being operatively connected to said diaphragm operating means, said diaphragm operating means being also subjected directly to the pressure of the refrigerant in the evaporating means.

5. Refrigerating apparatus including refrigerant evaporating means for cooling a fluid, a valve means for controlling the flow of liquid refrigerant into the evaporating means, said valve means having diaphragm operating means, said valve means having a thermostat bulb located in heat exchange relation with the refrigerant outlet of the evaporating means, said valve means having a second thermostat bulb located in the path of and responsive to the cooled fluid flowing away from the evaporating means, said first and second bulbs being connected in series and being operatively connected to said diaphragm means, said first and second bulbs containing an adsorbent and a gas capable of being adsorbed and evolved therefrom upon changes in temperature, said diaphragm operating means being also subjected directly to the pressure of the refrigerant in the evaporating means.

6. Refrigerating apparatus including refrigerant evaporating means for cooling a fluid, a valve means for controlling the flow of liquid refrigerant into the evaporating means, said valve means having diaphragm operating means, said valve means having a thermostat bulb located in heat exchange relation with the refrigerant outlet of the evaporating means, said valve means having a second thermostat bulb located in the path of and responsive to the cooled fluid flowing away from the evaporating means, said valve means having a third thermostat bulb located in the path of and responsive to the fluid to be cooled flowing to the evaporating means, said thermostat bulbs being operatively connected to said diaphragm operating means, said third thermostat bulb being effective to close the valve means when its temperature is reduced to a predetermined temperature, said diaphragm operating means being also subjected directly to the pressure of the refrigerant in the evaporating means.

7. Refrigerating apparatus including refrigerant evaporating means for cooling a fluid, valve means for controlling the flow of refrigerant through the evaporating means, said valve means having a first thermostat bulb mounted at the outlet of the evaporating means and a second thermostat bulb responsive to the temperature of the fluid flowing away from the evaporating means, a diaphragm means for operating said valve means, said diaphragm means being operatively connected to said first and second bulbs, said first and second bulbs being in open communication with each other.

8. Refrigerating apparatus including refrigerant evaporating means for cooling a fluid, valve means for controlling the flow of refrigerant through the evaporating means, said valve means having a first thermostat bulb mounted at the outlet of the evaporating means and a second thermostat bulb responsive to the temperature of the fluid flowing away from the evaporating means, a first diaphragm means for operating said valve means, said first diaphragm means being operatively connected to said first and second bulbs, said valve means also including a third thermostat bulb responsive to the temperature of the fluid flowing into contact with the evaporating means, and a second diaphragm means operably connected to said third bulb for operating said valve.

9. Refrigerating apparatus including refrigerant evaporating means for cooling a fluid, valve means for controlling the flow of refrigerant through the evaporating means, said valve means having a first thermostat bulb mounted at the outlet of the evaporating means and a second thermostat bulb responsive to the temperature of the fluid flowing away from the evaporating means, a first diaphragm means for operating said valve means, said first diaphragm means being operatively connected to said first and second bulbs, and a thermostatic means responsive to the temperature of the fluid flowing into contact with the evaporating means for operating said valve means.

10. Heat transfer apparatus including a heat transfer unit for tempering a medium to be tempered, valve means for controlling the flow of heat transfer fluid through the unit, a diaphragm means for operating said valve means, a thermostat bulb responsive to the temperature of the heat transfer fluid flowing out of the unit, a second thermostat bulb responsive to the temperature of the medium flowing away from the unit, said diaphragm means including a single diaphragm subject on one side to the fluid flowing through the valve and subject on the other side to pressure created by said thermostat bulbs.

11. Heat transfer apparatus including a heat transfer unit for tempering a medium to be tempered, valve means for controlling the flow of heat transfer fluid through the unit, a diaphragm means for operating said valve means, a thermostat bulb responsive to the temperature of the heat transfer fluid flowing out of the unit, a second thermostat bulb responsive to the temperature of the medium flowing away from the unit, said diaphragm means including a single diaphragm subject on one side to the fluid flowing through the valve and subject on the other side to pressure created by said thermostat bulbs, said diaphragm means also including a second diaphragm, said valve means also including a third means for operating said second diaphragm, said second diaphragm being operably connected to the valve means.

12. Heat transfer apparatus including a heat transfer unit for tempering a medium to be tempered, valve means for controlling the flow of heat transfer fluid through the unit, a diaphragm means for operating said valve means, a thermostat bulb responsive to the temperature of the heat transfer fluid flowing out of the unit, a second thermostat bulb responsive to the temperature of the medium flowing away from the unit, said diaphragm means including a single diaphragm subject on one side to the fluid flowing through the valve and subject on the other side to pressure created by said thermostat bulbs, said diaphragm means also including a second diaphragm operably connected to the valve means, and means for applying pressure to said second diaphragm.

13. Refrigerating apparatus including means forming a low temperature compartment and means forming a high temperature compartment, a lower temperature evaporating means for the lower temperature compartment, a higher temperature evaporating means for the higher temperature compartment, refrigerant liquefying means for supplying liquid refrigerant to and for withdrawing evaporated refrigerant from the lower and higher temperature evaporating means, valve means having one element responsive to the temperature of the refrigerant flowing out of the lower temperature evaporating means and another element responsive to the temperature of the medium in the lower temperature compartment for controlling the flow of refrigerant through said lower temperature evaporating means, and valve means having one element responsive to the temperature of the refrigerant flowing out of the higher temperature evaporating means and another element responsive to the temperature of the medium in the higher compartment for controlling the flow of refrigerant through the higher temperature evaporating means.

14. Refrigerating apparatus including refrigerant evaporating means for cooling a fluid, a valve means for controlling the flow of liquid refrigerant through the evaporating means, said valve means having pressure responsive operating means, said valve means having a thermostat bulb located in heat exchange relation with the refrigerant flowing through the evaporating means, said valve means having a second thermostat bulb located in the path of and responsive to the cooled fluid flowing away from the evaporating means, said valve means having a third thermostat bulb located in the path of and responsive to the fluid to be cooled flowing to the evaporating means, said thermostat bulbs being operatively connected to said pressure responsive operating means.

15. Refrigerating apparatus including refrigerant evaporating means for cooling a fluid, a valve means for controlling the flow of liquid refrigerant through the evaporating means, said valve means having pressure responsive operating means, said valve means having a thermostat bulb located in heat exchange relation with the refrigerant flowing through the evaporating means, said valve means having a second thermostat bulb located in the path of and responsive to the cooled fluid flowing away from the evaporating means, said first and second bulbs being connected in series and being operatively connected to said pressure responsive means, said first and second bulbs containing an adsorbent and a gas capable of being adsorbed and evolved therefrom upon changes in temperature.

16. Refrigerating apparatus including a refrigerant evaporating means for cooling a fluid, a valve means for controlling the flow of liquid refrigerant through the evaporating means, said valve means having a plurality of pressure operating means, said valve means having a thermostat bulb located in heat exchange relation with refrigerant flowing through the evaporating means, said valve means having a second thermostat bulb located in the path of and responsive to the cooled fluid flowing away from the evaporating means, said bulbs being in open communication with each other and being connected to one of said pressure operating means, said valve means having a third thermostat bulb located in the path of and responsive to the fluid to be cooled flowing to the evaporating means, said third thermostat bulb being operably connected to another of said pressure operating means, said third thermostat bulb being effective to close the valve means when its temperature is reduced to a predetermined temperature.

17. Refrigerating apparatus including refrigerant evaporating means for cooling a fluid, a valve means for controlling the flow of liquid refrigerant through the evaporating means, said valve means having a pressure responsive operating means, said valve means having a thermostat bulb located in heat exchange relation with the refrigerant flowing through the evaporating means, said valve means having a second thermostat bulb in open communication with the other thermostat bulb and located in the path of and responsive to the cooled fluid flowing away from the evaporating means, said first and second bulbs containing an adsorbent and a gas capable of being adsorbed and evolved therefrom upon changes in temperature, said bulbs being operably connected to said operating means, said operating means being also subject directly to the pressure of the refrigerant in the evaporating means.

18. Heat transfer apparatus including a heat transfer unit for tempering a medium to be tempered, valve means for controlling the flow of heat transfer fluid through the unit, a pressure responsive means for operating said valve means, a thermostat bulb responsive to the temperature of the heat transfer fluid flowing through the unit, a second thermostat bulb responsive to the temperature of the medium flowing away from the unit, said pressure responsive means including an element subject on one side to the fluid flowing through the valve and subject on the other side to pressure created by said thermostat bulbs.

19. Heat transfer apparatus including a heat transfer unit for tempering a medium, a valve means connected to said unit for controlling the supply of heat transfer fluid through said unit, said valve means having operating means, a thermostat bulb mounted in heat exchange relation with the heat transfer fluid flowing through said unit, said bulb being operably connected with said operating means, a second thermostat bulb located in and responsive to the medium flowing away from said unit, said second bulb being also operably connected to said operating means, said bulbs being connected in open communication with each other, said bulbs each containing an adsorbent and a gas capable of being adsorbed and evolved from the adsorbent.

20. Refrigerating apparatus including liquefying means and evaporating means, valve means for controlling the flow of refrigerant through the evaporating means, said valve means including diaphragm operating means exposed on one side to the refrigerant flowing through the evaporating means, a thermostat bulb charged with a solid adsorbent, said bulb being located in heat exchange relation with the refrigerant flowing through the evaporating means, means for connecting the interior of said bulb in open communication with the other side of said diaphragm operating means, said bulb and connecting means being charged with a gas capable of being absorbed and evolved from the solid adsorbent, said gas being non-condensible under operating conditions.

21. Refrigerating apparatus including liquefying means and evaporating means for cooling a medium, valve means for controlling the flow of refrigerant through the evaporating means, said valve means including operating means, a plurality of thermostat bulbs charged with a solid adsorbent, means for connecting the interior of said bulbs in open communication with each other and with said operating means, said bulbs and connecting means being charged with a gas capable of being absorbed and evolved from the solid adsorbent, one of said bulbs being located in heat exchange relation with the refrigerant flowing through the evaporating means.

22. Refrigerating apparatus including liquefying means and evaporating means, valve means for controlling the flow of refrigerant through the evaporating means, said valve means including operating means, a plurality of thermostat bulbs charged with a solid adsorbent, means for connecting the interior of said bulbs in open communication with each other and with said operating means, said bulbs and connecting means being charged with a gas capable of being absorbed and evolved from the solid adsorbent, one of said bulbs being located in heat exchange relation with the refrigerant flowing through the evaporating means, and a third thermostat bulb operably connected to said operating means.

23. Refrigerating apparatus including liquefying means and evaporating means for cooling a medium, a single valve means for controlling the flow of refrigerant through said evaporating means, operating means for said valve means including a plurality of thermostat bulbs in open communication with each other charged with a solid adsorbent and a gas capable of being adsorbed and evolved from said adsorbent upon temperature changes said operating means including a diaphragm exposed to the refrigerant on one side and to said gas on the other side, one of said bulbs being located in heat exchange relation with the refrigerant flowing through the evaporating means, another of said bulbs being located in heat exchange relation with said medium.

24. Refrigerating apparatus including liquefying means and evaporating means for cooling a medium, a single valve means for controlling the flow of refrigerant through said evaporating means, operating means for said valve means including three thermostat bulbs for controlling the operation of said valve means, said operating means being exposed on one side to the refrigerant flowing through the evaporating means, the other side of said operating means being connected to the interior of one of said bulbs, said one bulb being charged with a solid adsorbent and a gas non-condensible under operating conditions one of said bulbs being located in heat exchange relation with the refrigerant flowing through the evaporating means, another of said bulbs being located in heat exchange relation with said medium.

DANIEL L. KAUFMAN.